United States Patent

Watanabe et al.

[11] 3,817,600
[45] June 18, 1974

[54] ZOOM LENS HAVING CLOSE-UP FOCUSING MODE OF OPERATION

[75] Inventors: Rinzo Watanabe, Tokyo, Japan; Ellis I. Betensky, Stamford, Conn.

[73] Assignee: Ponder & Best, Inc., Los Angeles, Calif.

[22] Filed: June 1, 1972

[21] Appl. No.: 258,780

[30] Foreign Application Priority Data
June 14, 1971   Japan.............................. 46-41643

[52] U.S. Cl. ............................. 350/186, 350/187
[51] Int. Cl. ........................................... G02b 15/16
[58] Field of Search ................ 350/184, 186, 187

[56] References Cited
UNITED STATES PATENTS

| | | | |
|---|---|---|---|
| 3,346,320 | 10/1967 | Macher............................... | 350/184 |
| 3,391,973 | 7/1968 | Laurent............................ | 350/186 X |
| 3,659,921 | 5/1972 | Hirose et al. ...................... | 350/186 |
| 3,661,445 | 5/1972 | Someya........................... | 350/184 X |
| 3,731,987 | 5/1973 | Iida et al........................... | 350/187 |

*Primary Examiner*—John K. Corbin
*Attorney, Agent, or Firm*—DeLio and Montgomery

[57] ABSTRACT

This disclosure relates to a variable focal lens for a still camera having from front to rear a focusing group, a zooming group, a compensating group, and a fixed objective. In a zooming mode of operation, the second and third groups move in a first predetermined relation to vary the effective focal length of the lens system, while in a close focusing mode of operation the second and third groups move in a second predetermined relation for close-up focusing.

11 Claims, 19 Drawing Figures

FIG. 10a
EFL = 70 mm
H = 0

−1.0   +1.0

FIG. 11a
EFL = 130 mm
H = 0
f = 1:3.65

−1.0   +1.0

FIG. 12a
EFL = 205 mm
H = 0

−1.0   +1.0

SPHERICAL ABERRATION

───── SAGITAL
----- TANGENTIAL

−0.5   +0.5

ASTIGMATISM

DISTORTION

ZOOM LENS HAVING CLOSE-UP FOCUSING MODE OF OPERATION

This invention relates to lenses and more particularly relates to zoom lenses having an additional capability of close-up focusing.

Zooming lenses of the type using four lens groups for focusing, zooming, image plane position compensation, and a fixed objective are quite widely known.

The present invention is of such general construction and further includes structure to permit the zooming and compensating lens groups to be additionally utilized for focusing an object as close as eight centimeters from the front lens surface.

The invention provides a new and improved varifocal length lens which operates in either a zooming mode or in a close-up or macro mode for very close focusing. The invention further provides an optical system which permits these two modes of operation for a still camera, while providing an image quality comparable to a lens of fixed focal length.

Briefly stated, the invention in one form thereof comprises a lens having a zoom tube receiving a zooming lens group, and a zoom compensating lens group between a front focusing group and a rear fixed objective. The intermediate lens groups are movable in a first predetermined relation between the front and rear groups to vary the effective focal length of the lens system in a zooming mode of operation. The intermediate lens groups are further movable in a second predetermined relation for close-up focusing while in a macro mode of operation. The optics of the system are designed to allow this duality of operation while providing exceptionally good imagery in both modes of operation.

An object of this invention is to provide a new and improved zoom lens for a still camera.

Another object of this invention is to provide a zoom lens for a still camera in which the zooming elements may be utilized to provide close-up focusing of objects.

A further object of this invention is to provide a zoom lens having new and improved optics which is quite compact in dimension.

A still further object of this invention is to provide a lens serving the described functions characterized by a low degree of aberration over the full range of the variable focal length of the lens.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

Figure 1:
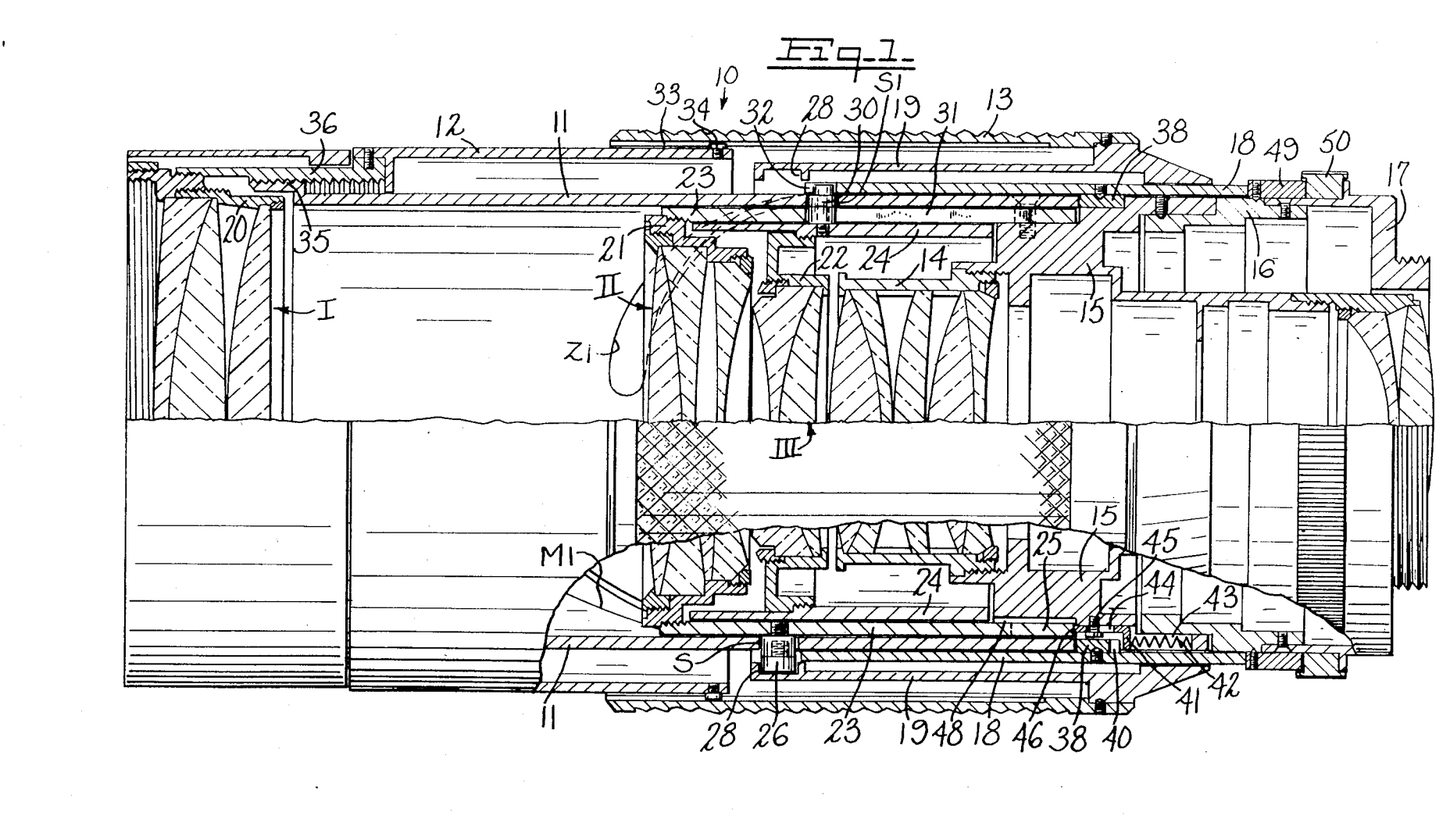
FIG. 1 is a side longitudinal half section, partly cut away of a lens assembly embodying the invention.

As shown in FIG. 1, an overall lens assembly 10 in which the invention may be embodied comprises a zoom tube 11, a focusing member 12, a focus and zoom ring 13 adapted to rotate member 12 and also slide longitudinally with respect thereto, housing members 14, 15 and 16 adapted to mount the fixed objective, hereinafter identified as Group IV, and a camera mount 17 secured to member 16. Tube 11 is fixed to member 14. The mount 17 as shown has a thread-type attachment. However, it may have a bayonet-type attachment dependent upon the camera body to which the lens 10 will be mounted.

The lens 10 further includes a mode selector ring or barrel 18 disposed about tube 11 and member 14, a focus and zoom ring support 19 which is rotatable and slidable with respect to barrel 18, a lens amount 20 for the focusing lens group I, a lens mount 21 for zoom lens group II and a lens mount 22 for the compensating lens group III. Lens mount 21 and lens group II are carried at one end of a zoom tube or ring 23, while lens mount 22 and lens group III are carried in a zoom tube or ring 24 within ring 23. Ring 23 has extensions 25 thereon as will be more clear from exploded views of FIGS. 2a and 2b.

Figure 2A:
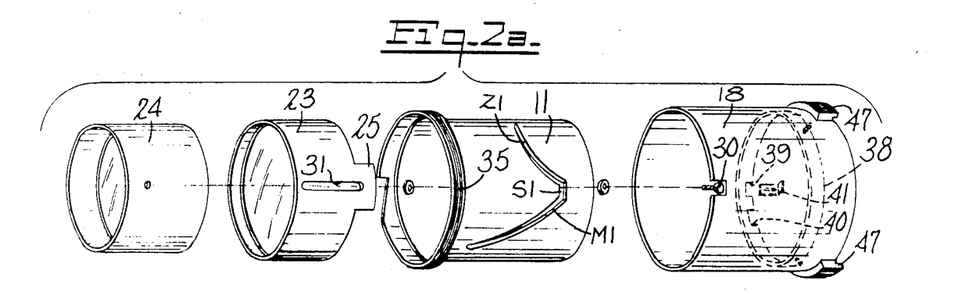
FIGS. 2a and 2b are exploded, isometric views of the movable lens elements of the lens of FIG. 1.
Figure 2B:
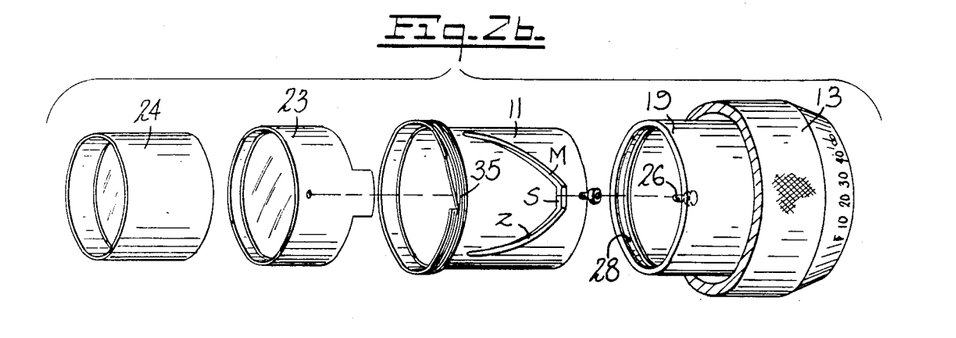

FIG. 2b illustrates essentially the same elements as FIG. 2a but with the parts rotated one hundred eighty degrees. FIG. 2a shows the mode ring 18 while FIG. 2b shows the focus and zoom ring 13 with the forwarded portion thereof cut away. The purpose of extensions 25 is to release a detent switch to permit the lens to be used in a zooming mode of operation or a macro mode.

During the zoom mode of operation, lens group II is moved along the length of tube 11 to vary the equivalent focal length (EFL) of the lens while compensating group III moves at a predetermined rate with respect to the zooming lens primarily to compensate for the image plane shift which occurs during zooming. While lens group III primarily acts as a compensator, it also cooperates with group II to vary the focal length. As will hereinafter be explained during the macro mode of operation, lens groups II and III move in fixed relation to focus an object at a very close distance to the lens.

A guide pin 26 is threadably received in tube 23 and extends therefrom through either a guide slot Z or a cam slot M in tube 11. The end of pin 26 is received within a channel 28 defined in the end of focus and zoom ring support 19.

With this arrangement, it will be seen that as focus and zoom ring 13 is moved linearly along tube 11, the pin in channel 28 will move in one of slots Z or M to impart a predetermined forward and reverse movement determined by the contour of cam slots Z or M, with respect to the linear movement of ring 13. A guide pin 30 extends from ring 24 through a longitudinal slot 31 in ring 23, through either of cam slots Z1 or M1 in tube 11 and into a cutout or recess 32 in mode ring 18. It will be noted that cam slots M and M1 in opposite sides of tube 11 have the same contour, while cam slots Z and Z1 have substantially different contours. As will hereinafter be more fully explained, during a zooming mode of operation, the guide pins 26 and 30 move in cam slots Z and Z1, respectively, while the same pins move in cam slots M and M1, respectively, during the macro mode of operation. Otherwise stated, there is a first pair of guides Z and Z1 for lens groups II and III during zooming and a second pair of guides M and M1 for close-up focusing.

In FIG. 1, the lens is shown with the lens groupings in position for a maximum focal length. Focusing a effected by rotating ring 13. Ring 13 receives in a slot 33 therein pins or screwheads 34 extending from focusing member 12. Thus member 12 will rotate with ring 13, and on focusing threads 35 on tube 11 to cause lens mount 20 attached to member 36 to advance or retract with respect to tube 11.

If it is desired to change the focal length from the maximum towards the minimum, ring 13 is moved longitudinally with respect to tube 11 and carries therewith pin 26 in channel 28. Pin 26 moves in cam slot Z in tube 11 and carries therewith tube 23 and lens group II mounted therein. Tube 23 may move longitudinally with respect to tube 24 by virtue of the slot 31 therein through which guide pin 30 extends. The rotary movement of tube 23 produces relative movement of guide pin 30 due to the walls defining slot Z1. Therefore, pin 30 will move in slot Z1 at a predetermined rate and distance relative to tube 23 and tube 24. Lens group III moves at a predetermined longitudinal rate with respect to lens group II.

With this related movement, ring 13 may be operated along tube 11 to vary the EFL of the lens system between the maximum and minimum design EFL's. Curves showing the relative movement of lens group II and III with respect to lens group IV during the zooming mode of operation are set forth in FIG. 8.

When it is desired to change to the macro mode of operation, ring 13 is moved to the maximum EFL position as shown in FIG. 1. This enables the guide pins 26 and 30 to enter connecting slots S and S1 between the cam slots Z, M and Z1 and M1, respectively, in tube 11. At this time, pin 30 is extending through slot 31 in zoom tube 23, slot S1 and into recess 32 in mode ring 18.

Figure 4:
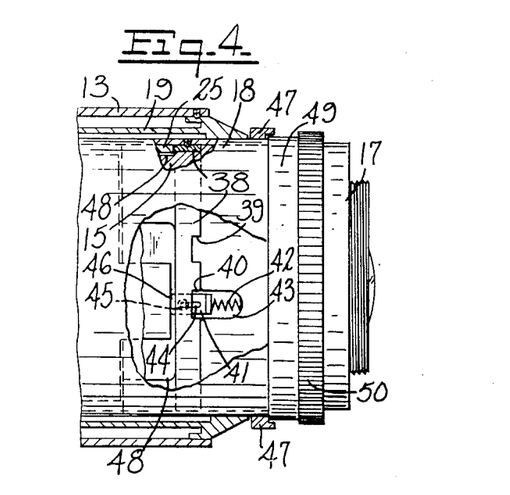
FIG. 4 is a view of the lens of FIG. 1 with a portion thereof cut away to reveal a mechanism for selecting between the modes of operation.
Figure 5:
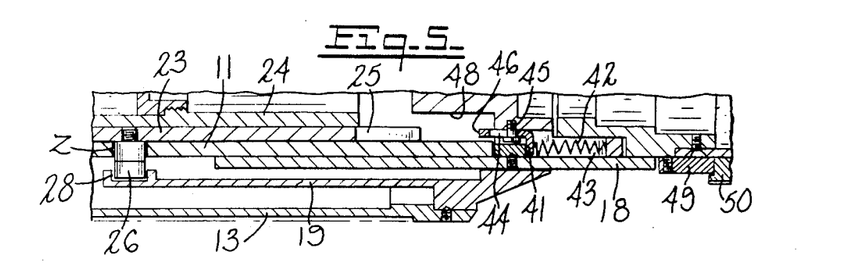
FIG. 5 is a sectional view of the lens as shown in FIG. 4, but rotated about ninety degrees.

Disposed within mode ring 18 at the end of tube 11 is a selector latch ring 38 seen more clearly in FIG. 2a, which has two detent recesses 39 and 40 defined therein and adapted to receive a detent latch member 41. As shown in FIGS. 1, 4 and 5, latch member 41 is acted upon by a spring 42 received in a slot 43 defined by the outer periphery of member 16 and mode ring 18. Member 41 has a slot 44 therein which receives therethrough a threaded guide pin 45 carried in member 15.

Latch member 41 is thus movable under or against the influence of spring 42 a predetermined distance defined by the length of slot 43. As shown in FIGS. 1 and 4, latch 41 is in an unlatched position without detent 40 by virtue of the fact that extension 25 of zoom tube 23 has engaged the leading edge 46 and moved member 41 back against the bias of spring 42. Mode ring 18 may now be rotated to allow latch 41 to enter detent 39 and switch to the macro mode of operation.

Figure 3:
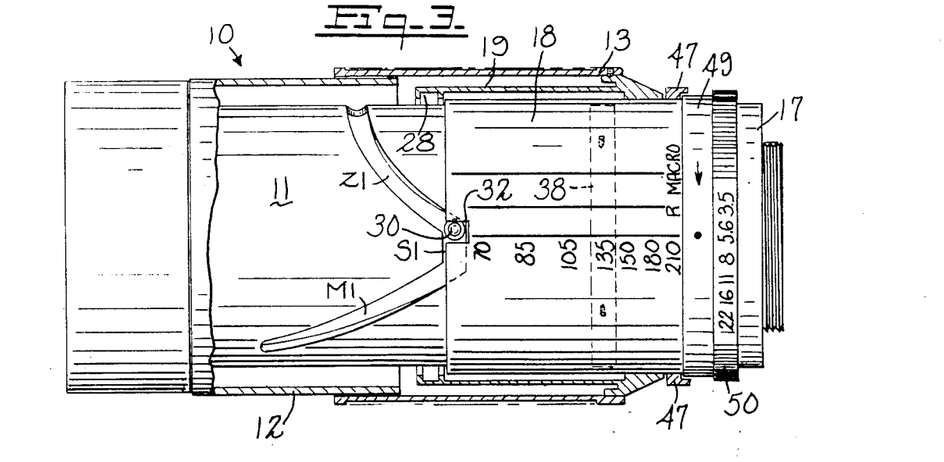
FIG. 3 is a top plan view of the lens of FIG. 1 with the focusing barrel cut away to expose the zoom tube.

As more clearly shown in FIG. 3, when the lens is to be switched to the macro mode of operation, the zoom ring will be fully retracted, pin 30 will be received in recess 32 of mode ring 18. Then mode ring 18 is rotated in the direction of the arrow to move pin 30, and therefore to the other end of slot S1 so that pin 30 may now move in slot M1. At the same time pin 26 will rotate in slot S to a position where it may enter cam slot M.

Slots M and M1 are arranged to provide equal movement of tubes 22 and 23. Ring 13 together with support member 19 and its channel 28 are moved longitudinally along tube 11. The movement of ring 13 causes pins 26 and 30 to follow cam slots M and M1, respectively, and lens groups II and III move for close focusing with a fixed distance therebetween.

In the particular lens system hereinafter described, an object may be photographed in the macro mode at a distance of between about 1.8 meters and 8 centimeters from the front lens.

Figure 6:
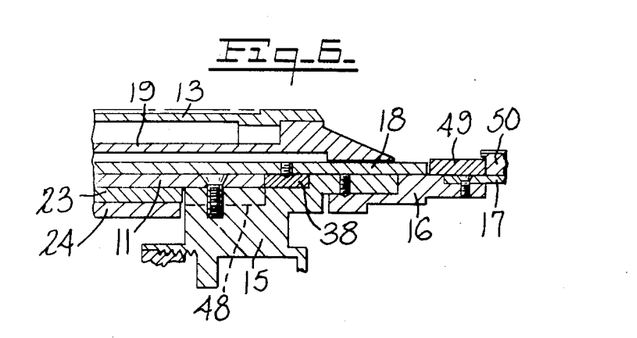
FIG. 6 is a sectional view of a portion of the lens showing a detail of construction thereof.

As more clearly shown in FIG. 4, when the extension 25 strikes detent latch member 41, then mode ring 18 may be rotated and for this purpose, finger grasps 47 may be provided thereon. As more clearly shown in FIGS. 4 and 6, member 15 is recessed as exemplified at 48 to permit the extensions 25 to engage the latch member 41.

To prevent unintended switching of the lens from zoom to macro, or vice versa, when it is at the maximum focal length position, frictional means, not shown, may be provided between the end of mode ring 18 and limit ring member 49 which extends about mounting member 17. Such frictional means may take many forms and would be adapted to allow rotation of mode ring 18 upon a predetermined torque assuming that latch member 41 is withdrawn from the slots 39 or 40.

The construction described supra is the subject of and is claimed in copending application Ser. No. 258,816, now U.S. Pat. No. 3,784,285 filed on the same day as this application and assigned to the same assignee.

The ring 50 is the usual aperture setting adjustment which would be disposed behind lens L13. Such construction and the connection to the adjustment therefor are well known in the art and are not set forth here to simplify the disclosure.

Figure 7:
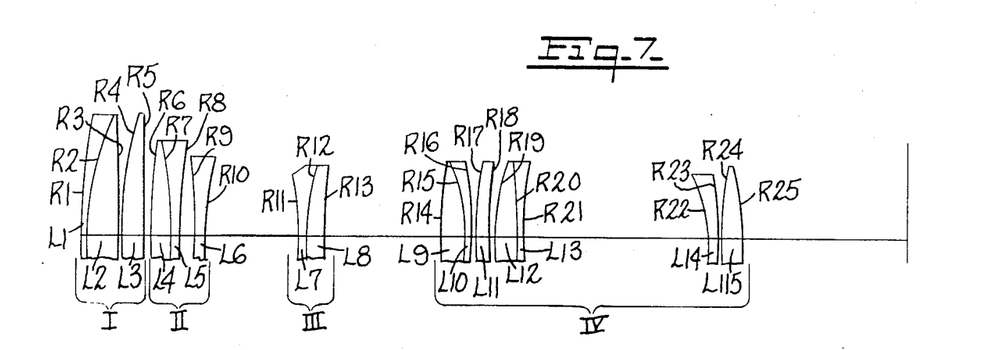
FIG. 7 is a schematic diagram of the lens elements.

A lens embodying the invention is shown in FIG. 7 and comprises elements L1–L15 in groups I – IV. The first or focusing group is effective to focus an object from infinity to 1.8 meters and is a three-element construction L1, L2 and L3 with a positive convex concave and convex-concave cemented doublet and a single double convex positive lens. Therefore, the first group is positive.

Group II is the zooming lens and is a three-element construction L4, L5 and L6, a double convex, double concave cemented doublet and a double concave negative lens. The second group or zoom lens therefore is of negative power.

Group III comprising lenses L7 and L8 is a two-element cemented construction with a double concave, convex-concave construction, and is of negative power.

The fourth group is a telephoto type lens utilizing a seven-element construction L9, L10, L11, L12, L13, L14, and L15 and is a positive lens group.

A lens embodying the invention and having an EFL of 70mm–205mm and a relative aperture of 1:3.65 as shown in FIG. 7 should meet certain general characteristics to provide the desired results while maintaining a compact size. Specifically, lens L10 should have a dispersion referenced by its Abbe number of 26 or greater. Lenses L9, L11, and L12 should have indices of refraction Nd of less than 1.52 in order to provide the necessary correction of Petzval curvature.

For a four group lens as shown in FIG. 7 and having an effective focal length of about 70mm to about 205mm, and the macro capability down to about 8cm from the front lens, the following conditions provide both the zoom and macro features, where F1, F2, and F3 are the focal lengths of lens groups I, II and III; F4 is the combined focal length of lens groups II and III when shifting for macro focusing; f7 is the focal length of lens L7; r11 is the radius of curvature of the eleventh lens surface (L7); and V7, V8 are the dispersions of the glass of lens L7 and L8 comprising group III expressed as the Abbe number.

1. $0.45F1 \leq |F2| \leq 0.55F1$
   $|F4| \leq 0.3F1$
2. $|0.4F3| \leq |f7| \leq 0.5F3$
   $|0.55F3| \leq |r11| \leq 0.6F3$
3. $23.0 \leq |V7-V8|$ For a lens of the focal length disclosed, Condition 1 is a fundamental requirement. During the macro mode of operation when lens groups II and III shift simultaneously toward group I the vocal length of the whole lens system decreases toward the lower focal length. The position of the back focus is considerably shifted when compared to the image plane. Therefore, close-up focusing is possible together with increased magnification.

Condition 2 is based on 1 and maintains a balance in aberration correction in both the zooming and macro modes.

Condition 3 provides compensation for chromatic aberration in both the zooming and macro modes.

A lens system for the described lens which meets the foregoing requirements and has an available EFL between 70mm and 205mm is shown in FIG. 7. This lens comprises groups I, II, III, and IV and a total of 15 elements.

TABLE I

| Lens | | Radius in mm | Lens Thickness or Air Space Distance | $N_d$ | $V_d$ |
|---|---|---|---|---|---|
| L1 | r1 | 268.54 | | | |
|   | r2 | 80.13 | 1.9 | 1.71736 | 29.5 |
| L2 |   |   | 6.9 | 1.58913 | 61.2 |
|   | r3 | −410.77 | | | |
|   |   |   | 0.3 | | |
|   | r4 | 90.60 | | | |
| L3 |   |   | 5.3 | 1.51009 | 63.4 |
|   | r5 | 3376.49 | | | |
|   |   |   | 2.041–47.555 | | |
|   | r6 | 222.96 | | | |
| L4 |   |   | 4.7 | 1.78472 | 25.7 |
|   | r7 | −81.30 | | | |
| L5 |   |   | 1.3 | 1.66672 | 48.4 |
|   | r8 | 154.03 | | | |
|   |   |   | 2.7 | | |

TABLE I-Continued

| Lens | | Radius in mm | Lens Thickness or Air Space Distance | $N_d$ | $V_d$ |
|---|---|---|---|---|---|
|   | r9 | −184.02 | | | |
| L6 |   |   | 1.0 | 1.66672 | 48.4 |
|   | r10 | 51.53 | | | |
|   |   |   | 28.624–6.000 | | |
|   | r11 | −47.69 | | | |
| L7 |   |   | 1.0 | 1.52249 | 59.6 |
|   | r12 | 33.79 | | | |
| L8 |   |   | 4.8 | 1.62588 | 35.6 |
|   | r13 | 153.92 | | | |
|   |   |   | 24.389–1.500 | | |
|   | r14 | 88.43 | | | |
| L9 |   |   | 6.5 | 1.48749 | 70.0 |
|   | r15 | −36.55 | | | |
| L10 |   |   | 1.46 | 1.80518 | 25.5 |
|   | r16 | −56.17 | | | |
|   |   |   | 0.3 | | |
|   | r17 | 61.15 | | | |
| L11 |   |   | 3.87 | 1.48749 | 70.0 |
|   | r18 | 284.27 | | | |
|   |   |   | 0.3 | | |
|   | r19 | 38.35 | | | |
| L12 |   |   | 6.0 | 1.48749 | 70.0 |
|   | r20 | −104.13 | | | |
| L13 |   |   | 1.023 | 1.64328 | 47.8 |
|   | r21 | 94.78 | | | |
|   |   |   | 49.846 | | |
|   | r22 | −20.19 | | | |
| L14 |   |   | 1.48 | 1.69700 | 48.5 |
|   | r23 | −53.33 | | | |
|   |   |   | 0.267 | | |
|   | r24 | 135.84 | | | |
| L15 |   |   | 4.0 | 1.58921 | 41.0 |
|   | r25 | −53.64 | | | |
|   |   |   | 160.000mm | | |

It will be noted that the overall dimension of the lens between surfaces r1 and r25 is substantially less than the maximum effective focal length, 205mm. Therefore a very compact telephoto lens is provided.

The focal lengths of the various lens groups are as follows:

| Group I | + 126.000mm |
|---|---|
| Group II | − 63.900mm |
| Group III | − 82.888mm |
| Group IV | + 44.040 |
| Groups II and III with 6.0 mm spacing | − 34.620 |

Figure 8:
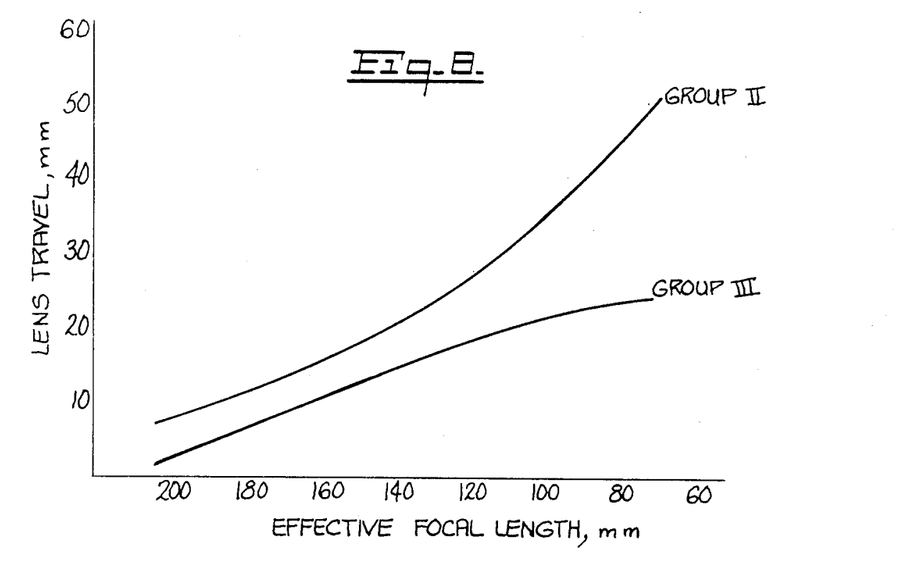
FIG. 8 are curves showing the relative movement of the zooming elements in the zooming mode of operation.
Figure 9:
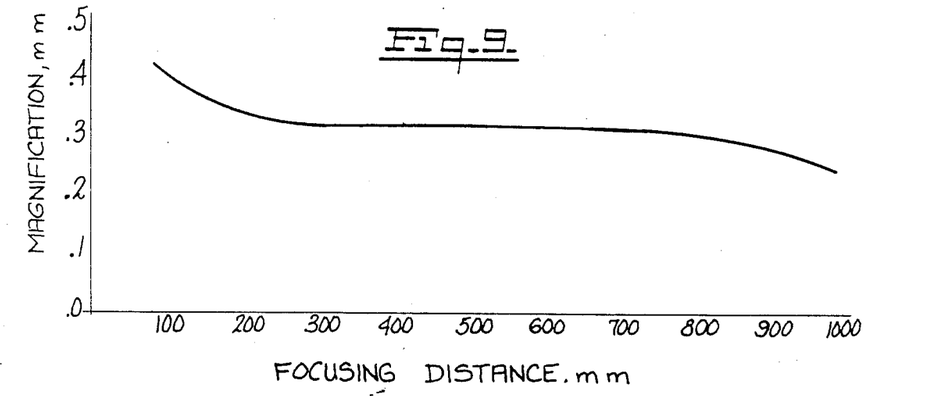
FIG. 9 is a curve showing magnification versus focusing distance for close-up focusing.

The movements of lens groups II and III during the zooming are set forth in FIG. 8. During the macro mode of operation the air space between the adjacent lens surfaces of Groups II and III is held constant at 6.0mm.

This lens when not in the macro mode will focus down to 1.8 meters. To focus below this distance, and to increase magnification, group I is left at a focus distance of 1.8 meters, while groups II and III are simultaneously moved forward with a constant air space therebetween.

Conditions 1, 2, and 3 are only exemplary for the particular lens system shown, and other conditions may be required for lens of other focal length ranges.

Figure 10A:
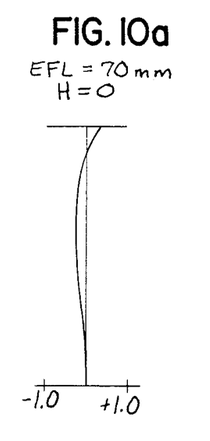
FIGS. 10a–10c, FIGS. 11a–11c, and FIGS. 12a–12c are plots of characteristics of a lens embodying the invention.
Figure 10B:
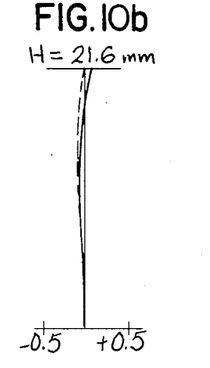
Figure 10C:
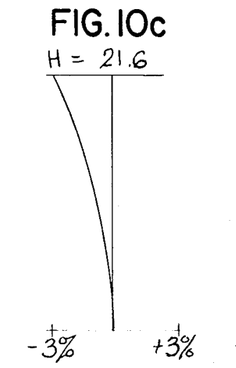
Figure 11A:
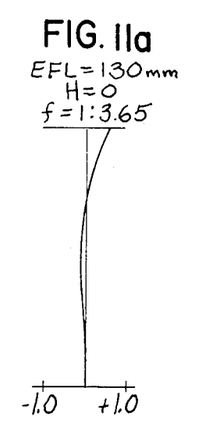
Figure 11B:
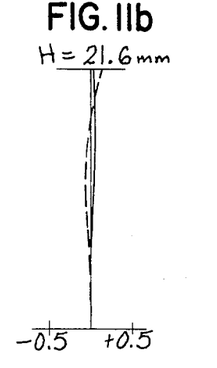
Figure 11C:
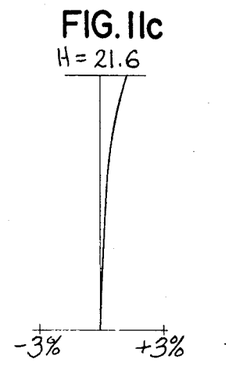
Figure 12A:
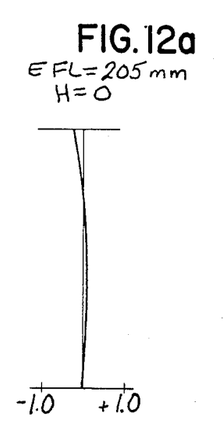
Figure 12B:
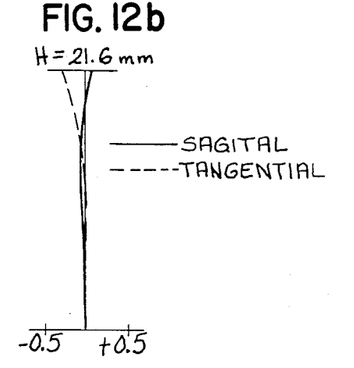
Figure 12C:
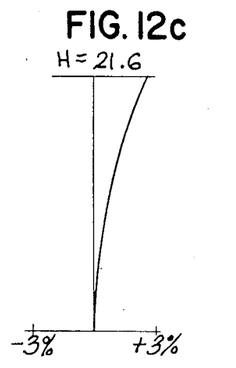

Characteristic curves of the lens of FIG. 7 for various focal lengths are set forth in FIGS. 10a, 10b, and 10c; FIGS. 11a, 11b, and 11c; and FIGS. 12a, 12b, and 12c to illustrate the overall efficiency of this lens throughout at minimum, maximum and median focal lengths.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments of the invention and modifications to the disclosed embodiments which do not depart from the spirit and scope of the invention.

What is claimed is:

1. A lens having a first front focusing lens group of positive power, a second zoom lens group of negative power, a third compensating lens group of negative power, and a fourth fixed objective of positive power from the front to back, said zoom group and said compensating group being movable axially in a first mode in a predetermined nonlinear relation to vary the equivalent focal length of said lens, and said zoom and compensating groups being movable together axially and equally in a second mode for close focusing.

2. The lens of claim 1 wherein said first group is a three element construction L1, L2, L3, comprising a convex-concave and double convex cemented doublet, and a single convex-concave lens; said second group is a three element construction L4, L5, L6 comprising a double convex, double concave cemented doublet and a double-concave single element; said third group is a two element construction L7, L8 comprising a double concave, convex-concave cemented doublet; and the fourth group is a seven element telephoto objective comprising a double convex, concave-convex cemented doublet L9, L10, a single convex-concave element L11, a double convex-double concave cemented doublet L12, L13, a concave-convex single element L14, and a double convex single element L15; where L1-L15 are the lens elements successively from the object to the film plane.

3. The lens of claim 2 wherein the axial distance of element L1 from the subject surface thereof to the film plane surface of L15 measured along the axis of the lens is less than the maximum equivalent focal length of the lens.

4. The lens of claim 2 wherein the dispersion of element L10 referenced by its Abbe number is 26.0 or greater.

5. The lens of claim 4 wherein the elements L9, L11 and L12 have indices of refraction of less than 1.52.

6. The lens of claim 1 wherein
$0.45 F1 \leq |F2| \leq 0.55 F1$
and
$|F4| \leq 0.3 F1$
where F1, and F2 and F3 are the equivalent focal lengths of the first, and second and third lens groups respectively, and F4 is the combined equivalent focal length of the second and third lens groups when positioned for close-up focusing.

7. The lens of claom 1 wherein said first group is a three element construction L1, L2, L3; said second group is a three element construction L4, L5, L6; said third group is a two element construction L7, L8; and the fourth group is a telephoto objective where L1–L8 are the lens elements successively from the object counted toward the film plane.

8. The lens of claim 7 wherein
$|0.4 F3| \leq |f7| \leq |0.5 F3|$
and
$|0.55 F3| \leq |r11| \leq |0.6 F3|$ where F3 is the equivalent focal length of said third lens group, f7 is the equivalent focal length of element L7 and r11 is the radius of curvature of the front surface of element L7.

9. The lens of claim 7 wherein the difference in the dispersions of lens element L7 and L8 as referenced to their Abbe numbers is greater than 23.0.

10. The lens of claim 7 having the following characteristics:

| Lens | | Radius in mm. | Lens Thickness or Air Space Distance | Nd | Vd |
|------|---|---------------|--------------------------------------|---------|------|
| L1   | r1 | 268.54 | | | |
|      |   |        | 1.9mm | 1.71736 | 29.5 |
|      | r2 | 80.13 | | | |
| L2   |   |        | 6.9 | 1.58913 | 61.2 |
|      | r3 | −410.77 | | | |
|      |   |        | 0.3 | | |
|      | r4 | 90.60 | | | |
| L3   |   |        | 5.3 | 1.51009 | 63.4 |
|      | r5 | 3376.49 | | | |
|      |   |        | 2.041–47.555 | | |
|      | r6 | 222.96 | | | |
| L4   |   |        | 4.7 | 1.78472 | 25.7 |
|      | r7 | −81.30 | | | |
| L5   |   |        | 1.3 | 1.66672 | 48.4 |
|      | r8 | 154.03 | | | |
|      |   |        | 2.7 | | |
|      | r9 | −184.02 | | | |
| L6   |   |        | 1.0 | 1.66672 | 48.4 |
|      | r10 | 51.53 | | | |
|      |   |        | 28.624–6.000 | | |
|      | r11 | −47.69 | | | |
| L7   |   |        | 1.0 | 1.52249 | 59.6 |
|      | r12 | 33.79 | | | |
| L8   |   |        | 4.8 | 1.62588 | 35.6 |
|      | r13 | 153.92 | | | |

Where the distance is measured along the axis of the lens, Nd is the index of refraction and Vd is the Abbe number.

11. The lens of claim 1 having the following characteristics where said first group comprises elements L1, L2, L3; said second group comprises elements L4, L5, L6; said third group comprises elements L7, L8; and said fourth group comprises elements L9–L15.

| Lens | | Radius in mm. | Lens Thickness or Air Space Distance | Nd | Vd |
|------|---|---------------|--------------------------------------|---------|------|
| L1   | r1 | 268.54 | | | |
|      |   |        | 1.9mm | 1.71736 | 29.5 |
|      | r2 | 80.13 | | | |
| L2   |   |        | 6.9 | 1.58913 | 61.2 |
|      | r3 | −410.77 | | | |
|      |   |        | 0.3 | | |
|      | r4 | 90.60 | | | |
| L3   |   |        | 5.3 | 1.51009 | 63.4 |
|      | r5 | 3376.49 | | | |
|      |   |        | 2.041–47.555 | | |
|      | r6 | 222.96 | | | |
| L4   |   |        | 4.7 | 1.78472 | 25.7 |
|      | r7 | −81.30 | | | |
| L5   |   |        | 1.3 | 1.66672 | 48.4 |
|      | r8 | 154.03 | | | |
|      |   |        | 2.7 | | |
|      | r9 | −184.02 | | | |
| L6   |   |        | 1.0 | 1.66672 | 48.4 |
|      | r10 | 51.53 | | | |
|      |   |        | 28.624–6.000 | | |
|      | r11 | −47.69 | | | |
| L7   |   |        | 1.0 | 1.52249 | 59.6 |
|      | r12 | 33.79 | | | |
| L8   |   |        | 4.8 | 1.62588 | 35.6 |

-Continued

| Lens | | Radius in mm. | Lens Thickness or Air Space Distance | Nd | Vd |
|---|---|---|---|---|---|
| | r13 | 153.92 | | | |
| | | | 24.389–1.500 | | |
| | r14 | 88.43 | | | |
| L9 | | | 6.5 | 1.48749 | 70.0 |
| | r15 | −36.55 | | | |
| L10 | | | 1.46 | 1.80518 | 25.5 |
| | r16 | −56.17 | | | |
| | | | 0.3 | | |
| | r17 | 61.15 | | | |
| L11 | | | 387 | 1.48749 | 70.0 |
| | r18 | 284.27 | | | |
| | | | 0.3 | | |
| | r19 | 38.35 | | | |
| L12 | | | 6.0 | 1.48749 | 70.0 |
| | r20 | −104.13 | | | |
| L13 | | | 1.023 | 1.64328 | 47.8 |
| | r21 | 94.78 | | | |
| | | | 49.846 | | |
| | r22 | −20.19 | | | |
| L14 | | | 1.48 | 1.69700 | 48.5 |
| | r23 | −53.33 | | | |
| | | | 0.267 | | |
| | r24 | 135.84 | | | |
| L15 | | | 4.0 | 1.58921 | 41.0 |
| | r25 | −53.64 | | | |

Where the distance is measured along the axis of the lens, Nd is the index of refraction and Vd is the Abbe number.

* * * * *

PO-1050
(5/69)

UNITED STATES PATENT OFFICE
CERTIFICATE OF CORRECTION

Patent No. 3,817,600            Dated June 18, 1974

Inventor(s) Rinzo Watanabe & Ellis I. Betensky

It is certified that error appears in the above-identified patent and that said Letters Patent are hereby corrected as shown below:

Column 3, line 16, after "Focusing" change "a" to -- is --. Column 3, line 40, change "group" to -- groups --. Column 4, 8th full paragraph, line 6, change "convex-concave" to -- double convex --. Column 4, 8th full paragraph, line 57, change "double convex" to -- convex-concave --. Column 7, line 53, delete "and third". Column 7, line 57, change "claom" to --claim--. Column 9, line 14, under the heading "Lens Thickness or Air Space Distance", change "387" to -- 3.87 --.

Signed and sealed this 17th day of September 1974.

(SEAL)
Attest:

McCOY M. GIBSON JR.            C. MARSHALL DANN
Attesting Officer               Commissioner of Patents